(12) United States Patent
Zadesky (10) Patent No.: US 6,507,485 B2
(45) Date of Patent: Jan. 14, 2003

(54) SPRING LOADED HINGE APPARATUS (75) Inventor: Stephen P. Zadesky, Redwood City, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/823,561

(22) Filed: Mar. 30, 2001

(65) Prior Publication Data

US 2002/0141145 A1 Oct. 3, 2002

Related U.S. Application Data (60) Provisional application No. 60/259,995, filed on Jan. 4, 2001.

(51) Int. Cl.[7] .................................................. G01F 6/16
(52) U.S. Cl. ......................... 361/683; 16/340; 280/624
(58) Field of Search ................................ 361/683–687, 361/724–727, 610; 16/430–431, 239, 242, 340–341; 280/624

(56) References Cited

U.S. PATENT DOCUMENTS

| | | | | |
|---|---|---|---|---|
| 4,692,838 A | * | 9/1987 | Merchant ..................... 361/610 |
| 4,897,873 A | | 1/1990 | Beutler et al. ............... 379/433 |
| 5,165,145 A | | 11/1992 | Sherman ...................... 16/341 |
| 5,555,157 A | | 9/1996 | Moller et al. ................ 361/683 |
| 5,789,828 A | * | 8/1998 | Tremaine et al. ........... 361/622 |
| 6,108,868 A | | 8/2000 | Lin .............................. 16/340 |
| 6,148,480 A | | 11/2000 | Cooke .......................... 16/303 |
| 6,252,767 B1 | * | 6/2001 | Carlson ....................... 361/683 |
| 6,256,129 B1 | * | 7/2001 | Kim et al. ................... 359/159 |

* cited by examiner

*Primary Examiner*—Darren Schuberg
*Assistant Examiner*—Hung Van Duong
(74) *Attorney, Agent, or Firm*—Beyer Weaver & Thomas, LLP (57) ABSTRACT

An improved hinge mechanism for use with a portable computing device is disclosed. The present invention relates to a hinge mechanism that is suitable for use in a portable computing device. According to one aspect of the present invention, a hinge mechanism that is used with a door in a portable computing device includes a spring coil, a stopper, and a pivot arm. The spring coil has a compressive state, e.g., the spring coil may be compressed or decompressed. The pivot arm is coupled to the stopper, and includes a first section as well as a second section. The first section is arranged to be positioned substantially within the spring coil, and the second section is arranged to be coupled to the door. Translational motion of the pivot arm causes the stopper to cause the compressive state of the spring coil to change. In one embodiment, the translational motion of the pivot arm causes the stopper to cause the spring coil to compress.

35 Claims, 8 Drawing Sheets

SPRING LOADED HINGE APPARATUS

This application claims benefit of Provisional Application Ser. No. 60/259,995 filed Jan. 4, 2001.

BACKGROUND OF THE INVENTION

1. Field of Invention

The present invention relates generally to hinge mechanisms. More particularly, the present invention relates to a hinge mechanism which is suitable for use in a portable computing device such as a notebook computer.

2. Description of the Related Art

Advances in technology have enabled the size of personal computers to decrease. As a result, the use of portable computers such as notebook, or laptop, computers and notepad computers is rapidly increasing. The portability of notebook computers and notepad computers enables a user to keep his or her computer readily accessible such that computing resources are effectively always at hand. By way of example, a notebook computer running on a battery pack enables a user to access computational resources without the need for external sources of electricity.

Figure 1A:
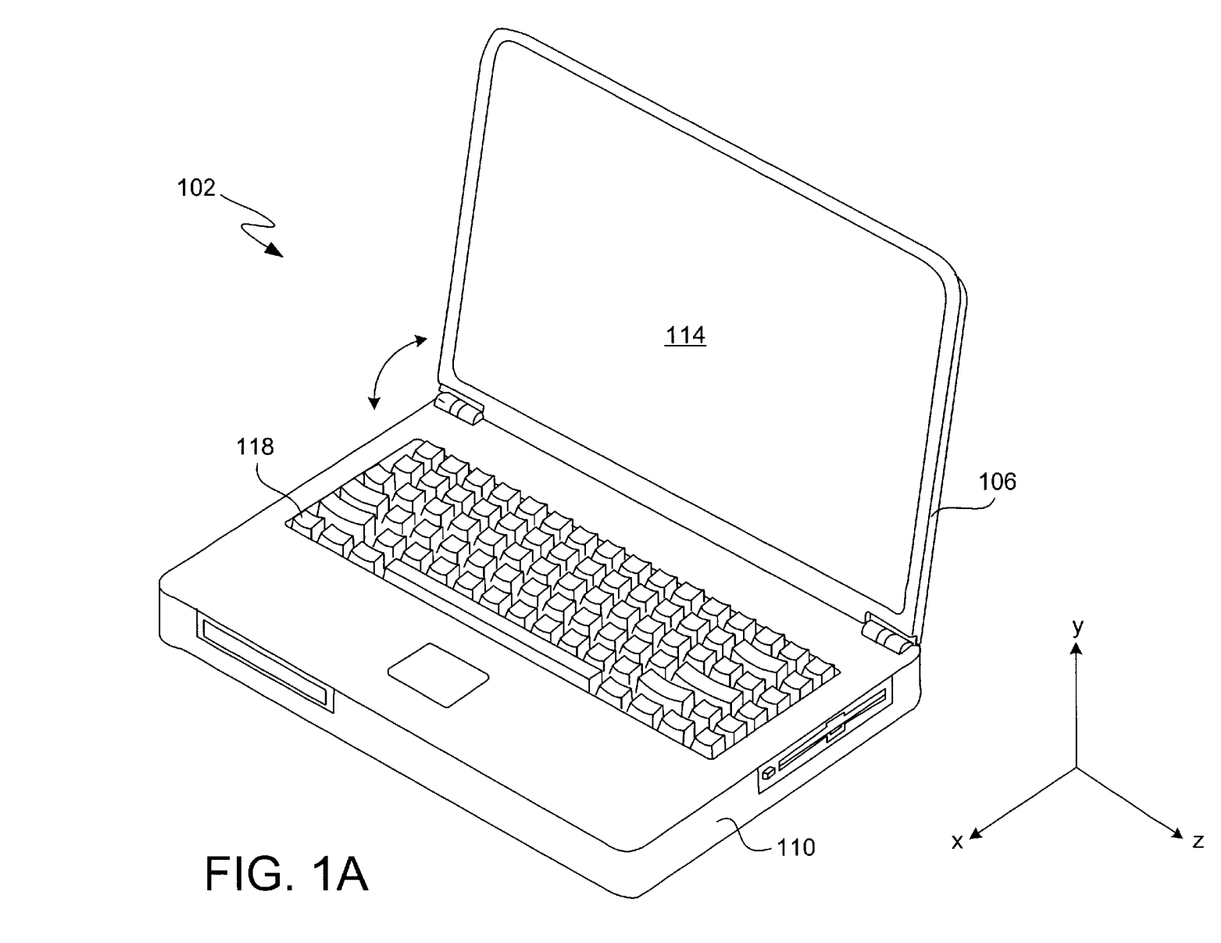
FIG. 1A is a diagrammatic representation of a portable, notebook computer.

Many portable computers are configured such that a display screen of the computer pivots, or rotates, with respect to the base of the computer. FIG. 1A is a diagrammatic representation of a portable computer or, more specifically, a notebook computer. A notebook computer 102 generally includes a display section 106 and a base section 110. Display section 106 typically includes a display screen 114, while base section 110 often includes an input/output device such as a keyboard 118, and houses a central processing unit and memory devices (not shown).

Notebook computer 102 typically includes connectors or ports (not shown) which enable notebook computer 102 to communicate with external sources and peripheral devices. Such connectors or ports may enable notebook computer 102 to communicate with, for example, a computer network, a printer, a serial device such as a mouse, a scanner, and a docking station. Connectors or ports may also enable notebook computer 102 to interface with a power source, e.g., an electrical outlet.

Figure 1B:
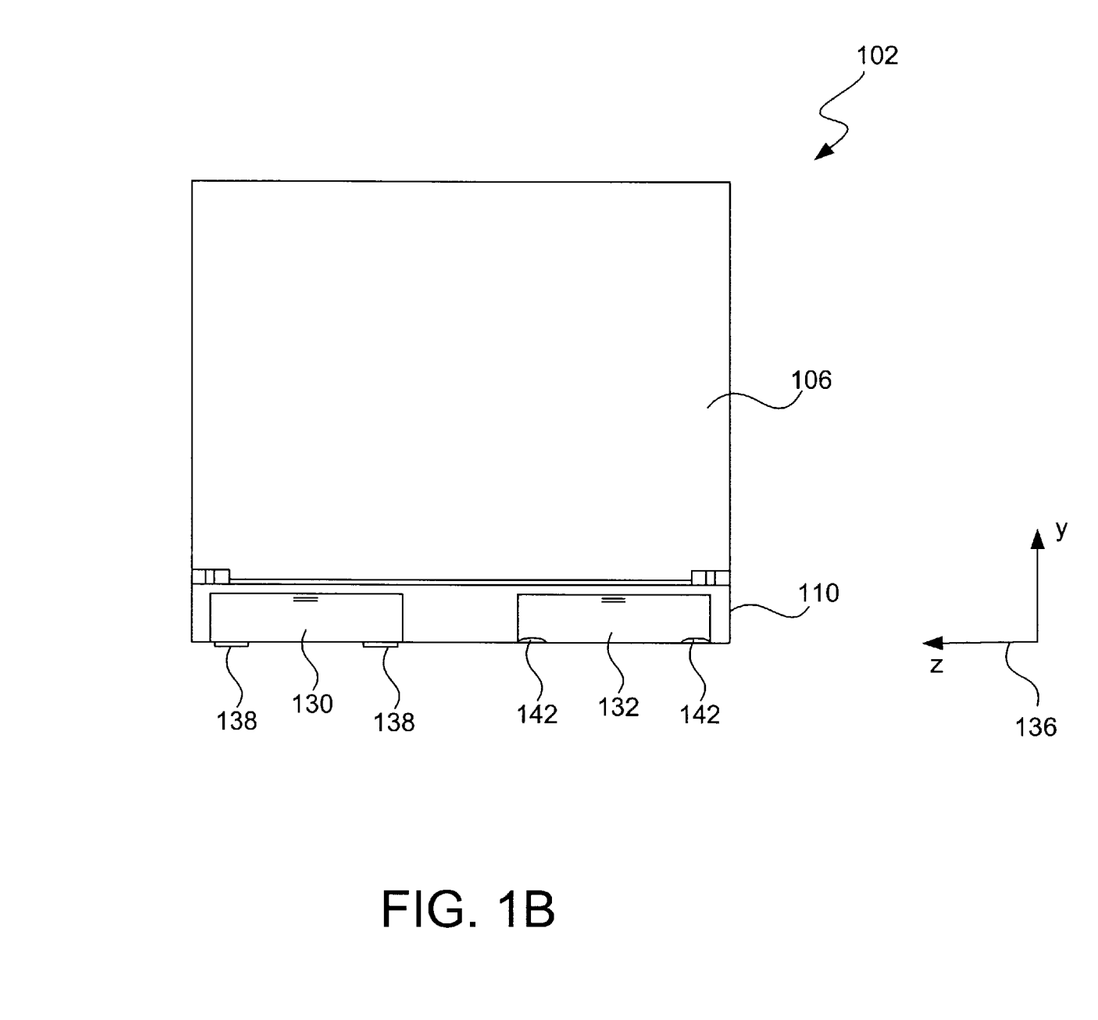
FIG. 1B is a diagrammatic representation of doors associated with a notebook computer, e.g., notebook computer 102 of FIG. 1A.

Connectors and ports associated with notebook computer 102 are often located at the rear of base section 110. Often, connectors and ports are covered by doors in order to protect the connectors and ports, e.g., from damage while notebook computer 102 is being transported. FIG. 1B is a diagrammatic representation of the back of notebook computer 102 of FIG. 1A. As shown, doors 130, 132 are located at the rear of base section 110, and are arranged to cover connectors and ports when closed. In general, doors 130, 132 are arranged to pivot about a z-axis 136 to open and to close.

Typically, hinges are used to rotationally couple doors 130, 132 to base section 110. Hinges used to couple doors 130 to base section 110 are generally either "external" hinges 138, i.e., hinges which are at least partially located outside of the profile of base section 110, or hidden hinges (not shown). Door 130 is shown as including external hinges 138 which effectively place the axis of rotation of door 130 outside of the profile, or outline, of base section 110 at all times. That is, external hinges 138 are always at least partially outside the outline of base section 110, regardless of whether door 130 is in an open position or a closed position. External hinges 138 increase the overall thickness of notebook computer 102, and may affect the physical stability of notebook computer 102 when notebook computer 102 is placed on a flat surface. By way of example, unless rubber pads or similar structures are added to the underside of base section 110 to compensate for the thickness of external hinges 138, notebook computer 102 may generally rest at an angle due to the thickness of external hinges 138. Further, external hinges 138 are often considered to be aesthetically non-pleasing.

Door 132 includes hidden or "internal" hinges (not shown) which effectively place the axis of rotation of door 132 inside the profile of base section 110. The use of internal hinges enables door 132 to open out from base section 110, and typically does not affect the thickness of notebook computer 102, i.e., internal hinges generally do not increase the profile of base section 110. As will be understood by those skilled in the art, the placement of internal hinges within the profile of base section 110 generally requires the presence of relatively significant openings or gaps 142 in door 132 or in base section 110 (not shown), or in both door 132 and base section 110. Gaps 142 enable door 132 to rotate with respect to the internal hinges. While internal hinges generally have no affect on the profile of base section 110, the presence of gaps 142 is often undesirable due at least in part to the fact that items may become lodged in gaps 142. In addition, gaps 142 may cause connectors and ports, as well as other components associated with base section 110, to be exposed to materials, e.g., dust particles, or moisture. Additionally, gaps 142 may be considered as being unpleasing to the eye.

Therefore, what is needed is a hinge mechanism for use with a door of a notebook computer which does not extend the profile of the notebook computer or require significant gaps between the door and the adjoining base section of the notebook computer. That is, what is desired is an internal hinge mechanism which enables the door to pivot without requiring the existence of a substantive between the door and the base section.

SUMMARY OF THE INVENTION

The present invention relates to a hinge mechanism that is suitable for use in a portable computing device. According to one aspect of the present invention, a hinge mechanism that is used with a door in a portable computing device includes a spring coil, a stopper, and a pivot arm. The spring coil has a compressive state, e.g., the spring coil may be compressed or decompressed. The pivot arm is coupled to the stopper, and includes a first section as well as a second section. The first section is arranged to be positioned substantially within the spring coil, and the second section is arranged to be coupled to the door. Translational motion of the pivot arm causes the stopper to cause the compressive state of the spring coil to change.

In one embodiment, the translational motion of the pivot arm causes the stopper to cause the spring coil to compress. In such an embodiment, a portable computing device which includes the hinge mechanism may also include a frame that is arranged to cooperate with the stopper to cause the spring coil to compress. For example, the spring coil may be compressed between the stopper and the frame.

A hinge mechanism of the present invention which enables a door of a computing device to open and close with respect to the computing device enables the components of the hinge mechanism to remain substantially within the footprint, e.g., outline or trace, of a base section of the computing device when the door is closed. The door has an axis of rotation which is defined with respect to the hinge mechanism, and may be translationally moved out of the footprint of the base section in order to enable the door to rotate about the axis when the axis is effectively outside of the footprint of the base section. Such an internal hinge mechanism generally does not affect the overall profile of the computing device, and enables the door to be opened and closed substantially without necessitating a relatively large opening to be cut into the door or into the base section near the door.

According to another aspect of the present invention, a computing device includes a display section and a base section which are in commuunication. The base section includes a frame, a door, and a hinge mechanism. The hinge mechanism is arranged to couple the frame and the door such that the door may move with respect to the frame. The hinge mechanism is further arranged to translate when the door rotates with respect to an axis. In one embodiment, when the door is in a first position with respect to the frame, the axis passes through the base section, and when the door is in a second position with respect to the frame, the axis does not pass through the base section.

In another embodiment, the hinge mechanism includes a pivot arm, a spring, and a plug. The pivot arm is coupled to the door, and the plug cooperates with the pivot arm to position the spring between the plug and the frame. In such an embodiment, the pivot arm may include a horizontal section and a vertical section. The horizontal section is generally substantially coincident with the axis, and the vertical section is generally arranged to support the plug. Further, the base section has a footprint. When the door is in a first position with respect to the frame, the horizontal section is within the footprint, and when the door is in a second position with respect to the frame, the horizontal section is substantially outside of the footprint.

According to still another aspect of the present invention, a hinge mechanism is arranged to couple a first piece to a second piece. The hinge mechanism includes a spring coil which defines an opening effectively through itself, and has a compressive state. The hinge mechanism also includes a stopper and a pivot arm which is coupled to the stopper. The pivot arm includes a vertical section which is positioned at least partially within the opening defined through the spring coil. The stopper is arranged to cooperate with the first piece to substantially hold the vertical section at least partially within the opening defined through the spring coil. The pivot arm also includes a horizontal section that is arranged to be coupled to the second piece. Motion of the second piece is arranged to cause the stopper to cause the compressive state of the spring coil to change. In one embodiment, the horizontal section defines an axis of rotation for the second piece. In such an embodiment, the pivot arm may be arranged to translate when the second piece rotates about the axis of rotation.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

A hinge is often used to rotationally couple a door to a base. By way of example, a hinge is typically used to couple a base section of a computing device, which includes connectors and ports, to a door that serves to protect the connectors and ports. A hinge that is used to rotationally couple a door of a computing device to a base of the computing device is typically either an external hinge or an internal hinge. Conventional external hinges generally add to the profile of a computing device, and internal hinges generally require significant gaps or holes to be associated with a door or the computing device such that the doors may rotate.

The present invention provides improved approaches for rotatably coupling a door to a base of a portable computing device. To enable a door to rotate with respect to a base or fixed section of a computing device substantially without increasing the profile of the device or requiring substantial gaps to be included in the device, an internal hinge which is arranged to translate may be coupled to the door. An internal hinge that translates enables a rotational axis of the door and, hence, the hinge, to be translated such that the rotational axis is outside of the outline of the base section when the door rotates about the rotational axis. A hinge which allows for translation of the rotational axis enables the size of gaps which facilitate the rotation of the door to be reduced, while allowing the hinge to remain internal to the base section when the door is in a closed position.

Figure 2:
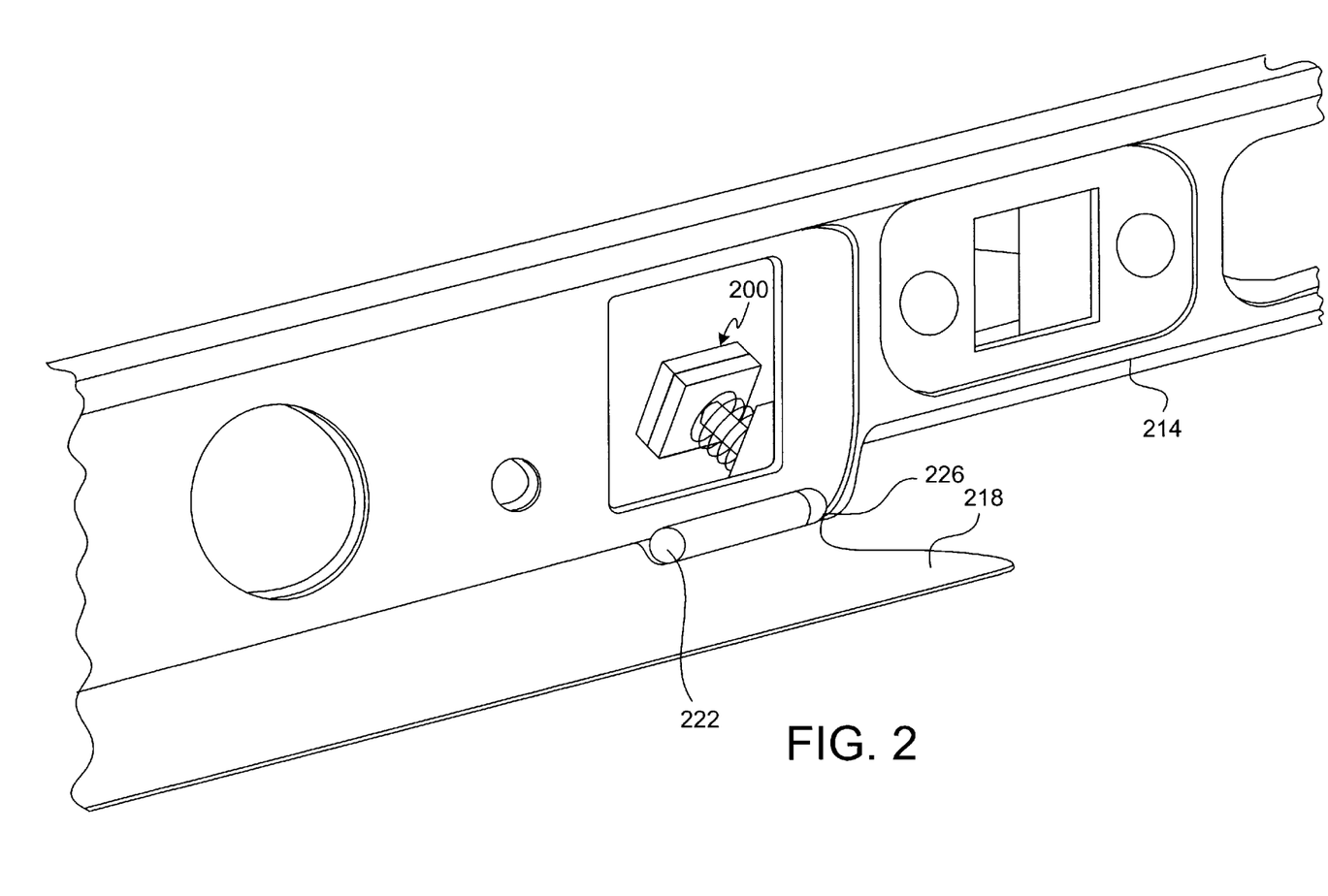
FIG. 2 is a diagrammatic representation of a hinge mechanism and a door in accordance with an embodiment of the present invention.

A hinge which has a translatable axis may be arranged within a base section of a computing device. That is, a hinge mechanism may be placed substantially within a space defined by a chassis of a base section of a computing device. FIG. 2 is a diagrammatic representation of a hinge mechanism and a door in accordance with an embodiment of the present invention. Most of a hinge mechanism 210 is arranged on one side of a base section chassis 214, while door 218 is substantially positioned on the opposite side of base section chassis 214. When door 218 is in an open position, as shown, a portion of a pivot arm 222 of hinge mechanism 210, which is positioned within a sleeve 226, e.g., curved portion, of door 218 may be on the same side of chassis 214 as door 218.

Figure 3A:
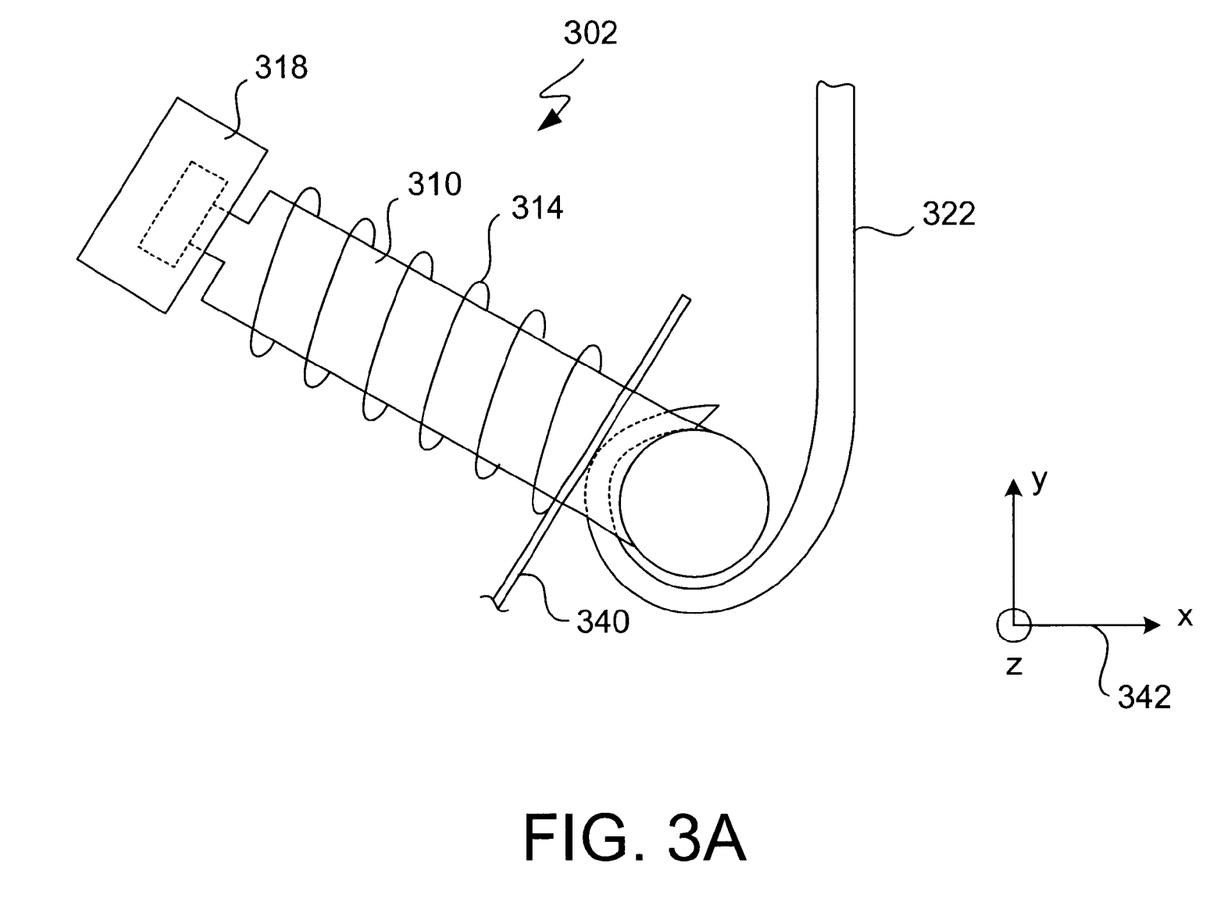
FIG. 3A is a diagrammatic representation of components of a hinge mechanism in accordance with an embodiment of the present invention.

FIG. 3A is a diagrammatic representation of components of a hinge mechanism in accordance with an embodiment of the present invention. A hinge mechanism 302, as discussed above, is arranged to be positioned substantially within a base section of a portable computing device when the door is closed, i.e., essentially held flush against the base section. Hinge mechanism 302 generally includes a pivot arm 310, which is shown in more detail in FIG. 3B, a spring 314, and a stopper 318. Pivot arm 310 is arranged to be coupled to a door 322. Spring 314, which is typically a coiled spring that may compress and extend when force is applied, is arranged such that spring 314 effectively winds around pivot art 310. Stopper 318, which is coupled to pivot arm 310, is arranged to compress spring 314 against a bracket 340 which is either part of or is coupled to the base section when pivot arm 310 translates in one direction. Stopper 318 is further causes spring 314 to return from a compressed state to a less compressed, e.g., uncompressed, state when pivot arm 310 translates in an opposite direction. The presence of spring 314 generally serves to prevent door 322 from being loosely coupled to a base section. In other words, spring 314 may be considered as providing some dampening in the motions which occur when door 322 opens.

Figure 3B:
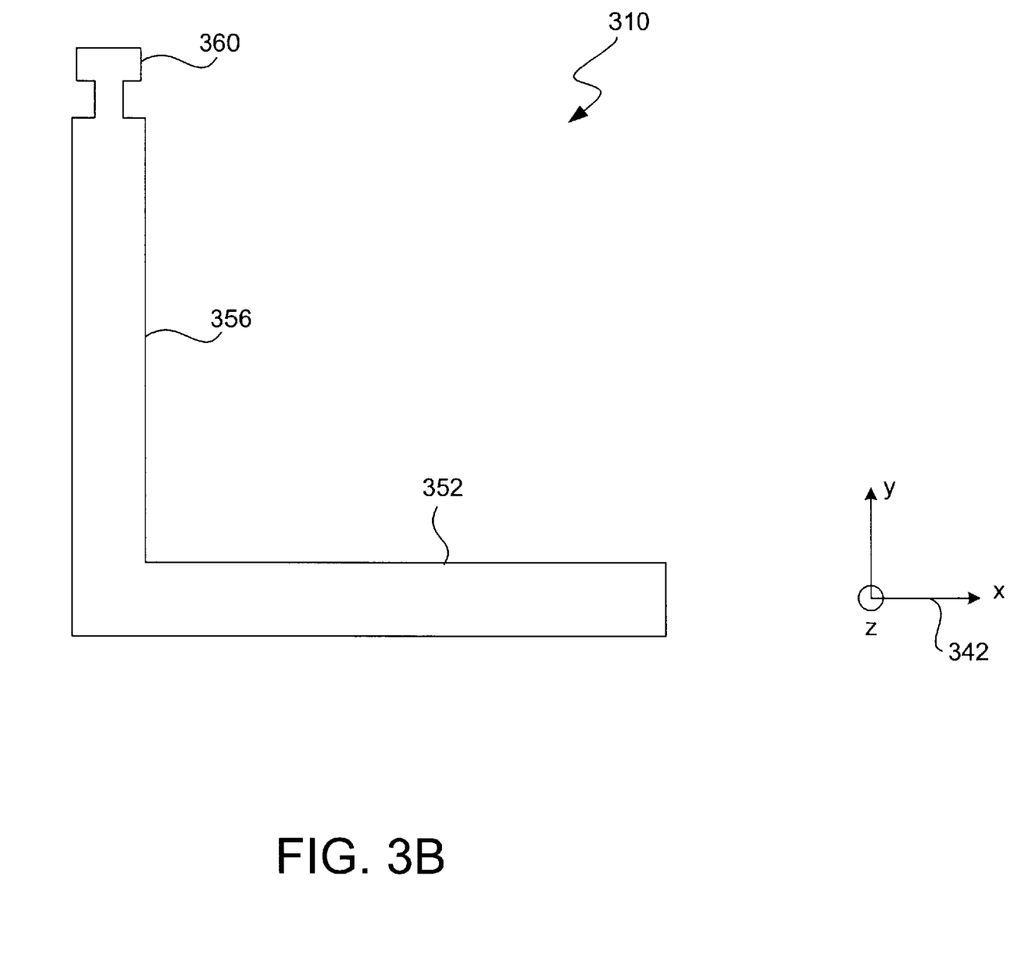
FIG. 3B is a diagrammatic representation of a pivot arm, i.e., pivot arm 310 of FIG. 3A, in accordance with an embodiment of the present invention.

Pivot arm 310 is typically substantially "L shaped," as shown in FIG. 3B, and includes a horizontal section 352, a vertical section 356, and an end section 360. Horizontal section 352 defines a horizontal axis about which door 322 may pivot. Further, horizontal section 352 is arranged to couple pivot arm 310 to door 322 such that pivot arm 310 may at least slightly move, e.g., slide, with respect to door 322. That is, horizontal section 352 is typically not rigidly coupled to door 322. In one embodiment, horizontal section 352 is coupled to door 322 through a curved section of door which effectively servaes as a channel or groove for holding at least a portion of horizontal section 352. Vertical section 356 defines a translatable axis about which hinge mechanism 302 may slide. Further, vertical section 356 is arranged such that spring 314 may fit over vertical section 356. End section 360, which is at an end of vertical section 356, is generally arranged to accommodate stop 318.

Although the components of hinge mechanism 302 may be formed from substantially any suitable material, pivot arm 310 is generally formed from a metal such as machined stainless steel. Spring 314 is generally formed from coiled spring steel or piano wire, and may be preloaded. That is, spring 314 may have a slight preload when door 322 is in a closed position. In the described embodiment, stop 318 is a rubber plug, although stop 318 may also be formed from a material such as metal.

As will be appreciated by those skilled in the art, spring 314 generally has an associated stiffness. While the stiffness of spring 314 may vary widely depending upon the requirements of a particular portable computing system, the stiffness is typically chosen to provide a balance between enabling door 322 to be held in a closed position when necessary, and enabling door 322 to be held in an open position when necessary.

Hinge mechanism 302 is arranged such that when door 322 is to be opened from a closed position, door translates 322 prior to rotating. The translation of door 322 brings a portion pivot arm 310 or, more specifically, horizontal section 352, outside of the outline of the base section prior to allowing door 322 to rotate, i.e., about a z-axis 342. By moving the axis of rotation outside of the profile of the base section substantially before allowing door 322 to rotate, the size of a gap in door 322 or between a bottom of door 322 and the base section may be substantially minimized. In other words, the size of a gap which generally enables pivoting of door 322 into the base section may be reduced.

Figure 4A:
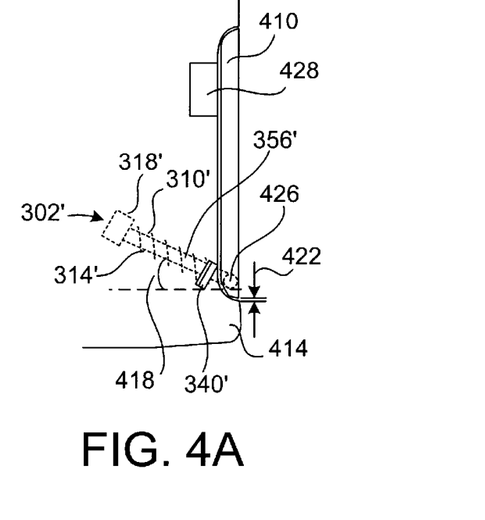
FIG. 4A is a diagrammatic side-view representation of a door in a closed position in accordance with an embodiment of the present invention.

FIG. 4A is a diagrammatic side-view representation of a door in a closed position in accordance with an embodiment of the present invention. A door 410 is coupled to a base section 414 of a computing device by a hinge mechanism 302'. For ease of illustration, door 410, base section 414, and hinge mechanism 302' have not been drawn to scale. The vertical section of a pivot arm 310' of the hinge mechanism 302' is generally slidable relative to the base section 414. For example, the bracket 340' may include a through hole for receiving the vertical section 356'. It should be understood, however, that this is not a limitation and that the sliding or translating nature of the hinge mechanism may vary according to the needs of each device.

Further, the hinge mechanism 302' is arranged such that the vertical section of a pivot arm 310' of hinge mechanism 302' at an angle 418 with respect to a bottom of base section 414. In general, the smaller angle 418 is, the larger a gap 422 between door 410 and base 414 would be to enable door 410 to pivot. However, increasing angle 418 often causes difficulty in pivoting door 410. In other words, increasing angle 418 typically adversely affects the operation of door 410. In one embodiment, angle 418 is chosen to maximize space inside the base section of the portable computing device without significantly affecting the operation of door 410. By way of example, the angle may be chosen to maximize the allowable main logic board space. As should be appreciated, the main logic board contains the processor, chips, and the like. In one embodiment, angle 418 is chosen to be in the range of approximately 25 degrees to approximately 35 degrees, e.g., approximately 30 degrees, to enable gap 422 to be a tight gap while still enabling door 410 to readily pivot.

In the illustrated embodiment, the spring 314' is arranged to substantially hold the door 410 relative to the base section 414. That is, the spring 314' biases the door 410 towards the base section 414 such that the door 410 is held in contact with the base section 414 thus placing the door 410 in the closed position.

In addition, a door securing system 428 (shown in block form) may be provided to help hold the door 410 relative to the base 414, i.e., in the closed position. By way of example, the door securing system 428 may be a latching device that uses latches and engageable slots, a camming arrangement that uses a locking cam and a camming groove and/or a magnetic device that uses a magnet and a metallic surface. With regards to the magnetic device, the door securing system 428 generally includes a metallic surface and a magnet for magnetically clamping the door 410 to the base section 414. The metallic surface may be provided by a door made of metal or by a metal plate that is attached to the door, and the magnet may be attached directly or indirectly to the base section (or vice versa). By way of example, the magnet may be attached to the base section itself, to a frame that supports the base section, or to some other component that is connected to the base section. In this embodiment, the magnet and metallic surface are cooperatively positioned so that when the door 410 is placed within the recessed portion of the base section 414, the magnet and metallic surface are magnetically attracted (or drawn) to one another thus clamping the door 410 to the base section 414. As should be appreciated, this particular feature allows the door 410 to be easily moved and reattached.

Figure 4B:
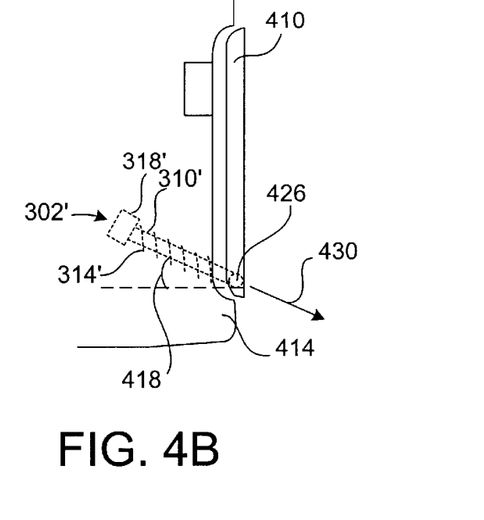
FIG. 4B is a diagrammatic side-view representation of a door, i.e., door 410 of FIG. 4A, in a translated open position in accordance with an embodiment of the present invention.

FIG. 4B is a diagrammatic side-view representation door 410 in a translated open position in accordance with an embodiment of the present invention. As shown in FIG. 4B, a pivot point 426 or axis of rotation of door 410 is translated out of the outline or footprint of base section 414 before rotating the door 410. Pivot point 426, which is generally coincident with a central horizontal axis associated with pivot arm 310' of hinge mechanism 302', is translated in an x-y direction 430. Pivot point 426 is translated in an x-y direction 430, or at angle 418, in order to move pivot point 426 out of the footprint of base section 414. The translation of pivot point 426 enables door 410, when rotating, to not rotate significantly "into" base section 414. In other words, the translation of pivot point 426 allows gap 422, as shown in of FIG. 4A, to remain relatively small while allowing door 410 to rotate.

When door 410 translates in direction 430, i.e., when door 410 begins to open, at least a part of hinge mechanism 302' also translates in direction 430. Specifically, pivot arm 310' and a stop 318' of hinge mechanism 302' translate in direction 430, while a spring 314' of hinge mechanism 302' may begin to compress, e.g., be in a compressive state, between a frame of base section 414 and stop 318' of hinge mechanism 302', as described above.

Figure 4C:
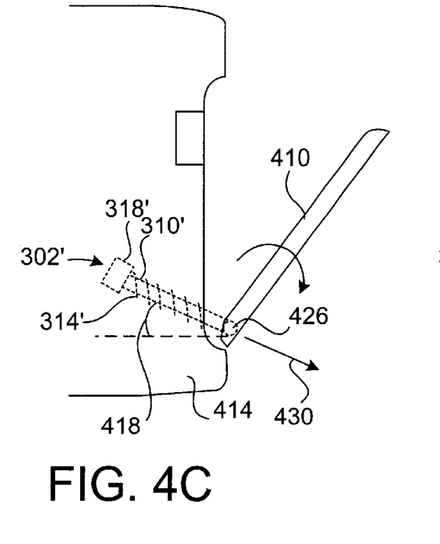
FIG. 4C is a diagrammatic side-view representation of a door, i.e., door 410 of FIG. 4A, in a rotated position in accordance with an embodiment of the present invention.

FIG. 4C is a diagrammatic side-view representation door 410 in a partially translated and rotated open position in accordance with an embodiment of the present invention. Once pivot point 426 has effectively been translated out of the outline or profile of base section 414, door 410 may pivot about pivot point 426. In the described embodiment, while door 410 pivots about pivot point 426, portions of hinge mechanism 302', i.e., pivot arm 310' and stop 318', continue to translate in direction 430. As stop 318' translates, spring 314' of hinge mechanism 302' typically continues to compress. By way of example, the spring may compress by directly pulling on the door, or by indirectly pushing on the base with the bottom portion of the door via a cam action.

Figure 4D:
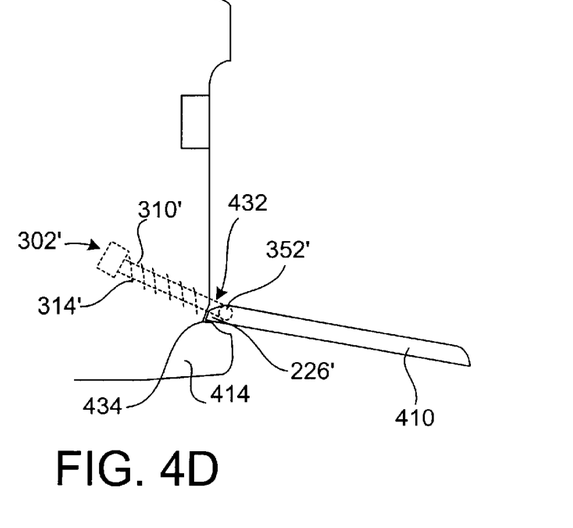
FIG. 4D is a diagrammatic side-view representation of a door, i.e., door 410 of FIG. 4A, in an open position in accordance with an embodiment of the present invention.

FIG. 4D is a diagrammatic side-view representation of a door in an open position in accordance with an embodiment of the present invention. The hinge mechanism 302' is generally arranged to have a securing action that effectively holds the door 410 in an open position, i.e., when the door is considered to be fully open. In the illustrated embodiment, the securing action is implemented by a camming mechanism 432. As shown, the camming mechanism 432 utilizes a portion of the base section 414, a portion of the door 410, the translating motion of the hinge mechanism 302', and the compressive force of the spring 314'. The base section generally includes a camming groove 434 that is arranged to receive the sleeve 226' of the door 410. As such, when the door 410 is rotated into the open position, the compressive nature of the spring 314' forces the sleeve 226' into the camming groove 434 (via translation) thus securing the door 410 in the open position. That is, the camming groove 434 serves to hold the door 410 open by supporting the horizontal member 352' of the pivot arm 310' of the hinge mechanism 302' and the portion of the door 410 (e.g., sleeve 226') which is in contact with the horizontal member 352' of pivot arm 310'.

Figure 5:
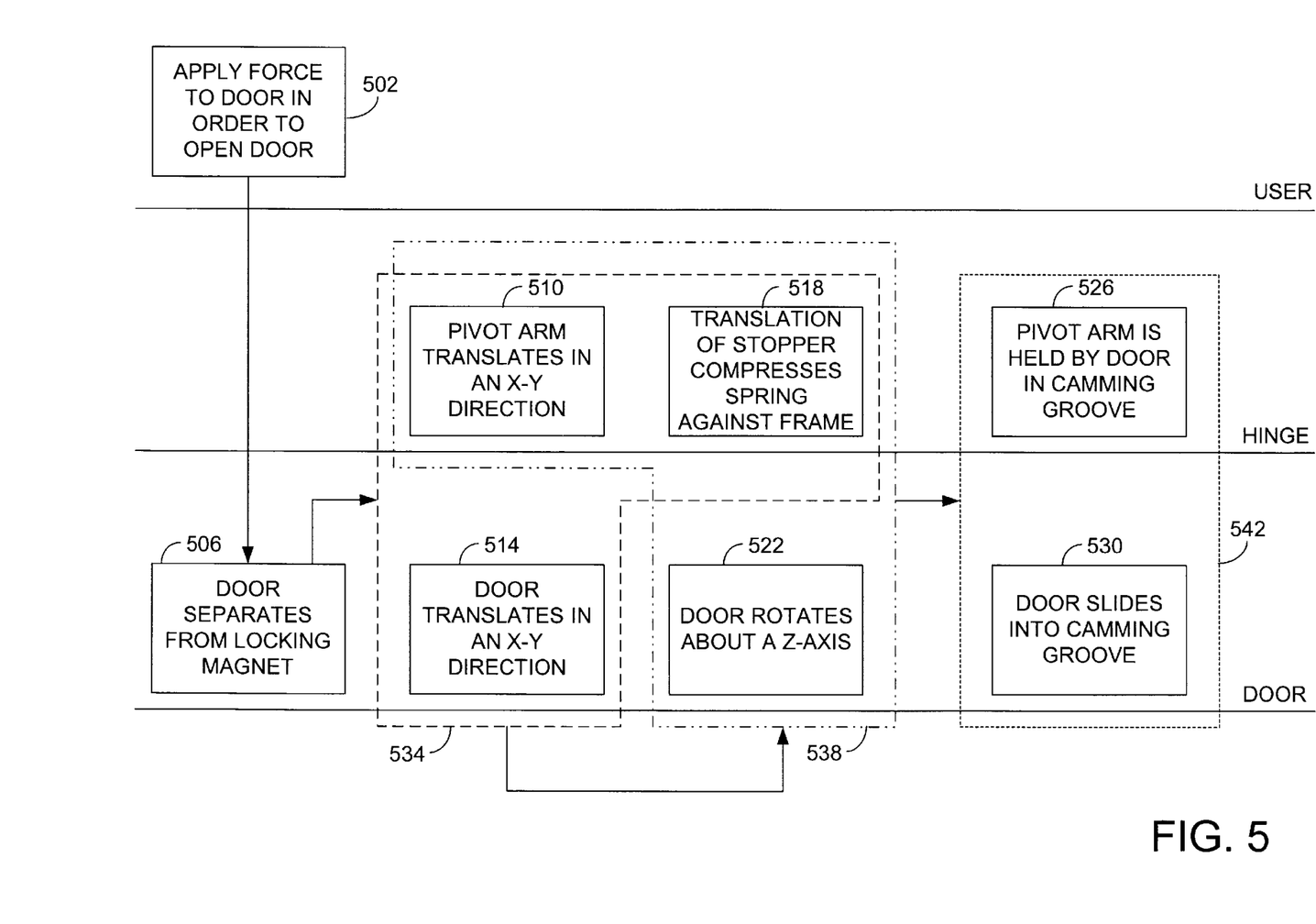
FIG. 5 is a block diagram representation of the actions associated with opening a door held by a translational hinge mechanism in accordance with an embodiment of the present invention.

In the described embodiment, the opening and closing of a door causes translational motion of both the door and a hinge mechanism, as well as rotational motion of the door. Referring next to FIG. 5, the actions which occur when a door that is coupled to a translational hinge mechanism is opened will be described in accordance with an embodiment of the present invention. A first action 502, e.g., step, occurs when force or torque is applied to a door of a computing device in order to open the door. In general, the force is applied by a user who wishes to obtain access to connectors or ports which are protected by the door. After force is first applied to the door, the next action 506 occurs when the door is separated from the locking magnet which is arranged to secure the door against, for example, a base section of the computing device. It should be appreciated that a locking magnet is one example of a locking mechanism which is suitable for securing a door against the base section of the computing device. Generally, substantially any suitable locking mechanism, e.g., a latch, may be used to secure the door against the base section of the computing device. In the described embodiment, the door may be formed from a metallic material which may be secured substantially directly against a locking magnet on the base section.

Once the door is separated from the locking magnet by the force applied to the door, i.e., by pulling on the door, the next action 514 that occurs is that the door translates linearly, e.g., in an x-y direction. The linear translation of the door in an x-y direction also causes an action 510 in which the pivot arm translates in substantially the same direction as the door, and an action 518 in which the translation of the pivot arm causes the translation of the stop or stopper and, hence, the compression of the spring against a frame of the base section. Actions 514, 510, and 518 may be considered to be an overall linear translational action 534.

The translation of the door effectively moves the rotational axis of the door outside of the profile of the base section, i.e., outside of the footprint of the base section or the area encompassed by the base section when the door is closed. By moving the rotational axis of the door so that the rotational axis is essentially not within the profile of the base section when the door is rotates, the size of a gap which facilitates rotation, and may generally either be in or near the door, may be reduced.

Typically, after the overall linear translational action 534 is completed, an overall rotational action 538 of the door may then occur. Overall rotational action 538 may include an action 522 in which the door rotates, or pivots, about a z-axis. While the door pivots about a z-axis, the pivot arm continues to translate in an x-y direction, i.e., action 510 continues, and the spring continues to be compressed, i.e., action 518 continues. As the door pivots, the door effectively "pulls" the pivot arm such that the pivot arm translates in an x-y direction, and the stopper pushes on the spring to compress the spring between the stopper and the frame of the base section. The compression of the spring changes the compressive state of the spring, and may serve to provide some damping resistance to the opening of the door.

When the door is considered to be fully open, an overall securing action 542 occurs. In the described embodiment, overall securing action 542 effectively holds the door in an open position using an action 530 which slides the door, e.g., the portion of the door which is in contact with the hinge, into a camming groove, and an action 526 in which the pivot arm of the hinge is held in the camming groove. The canning groove, or surface, serves to hold the door open by supporting the pivot arm of the hinge and the portion of the door which is in contact with the pivot arm. The portion of the door which is in contact with the pivot arm may be a sleeve, e.g., sleeve 226 of FIG. 2. Typically, the camming groove is formed on an outer surface of the base section.

Figure 6:
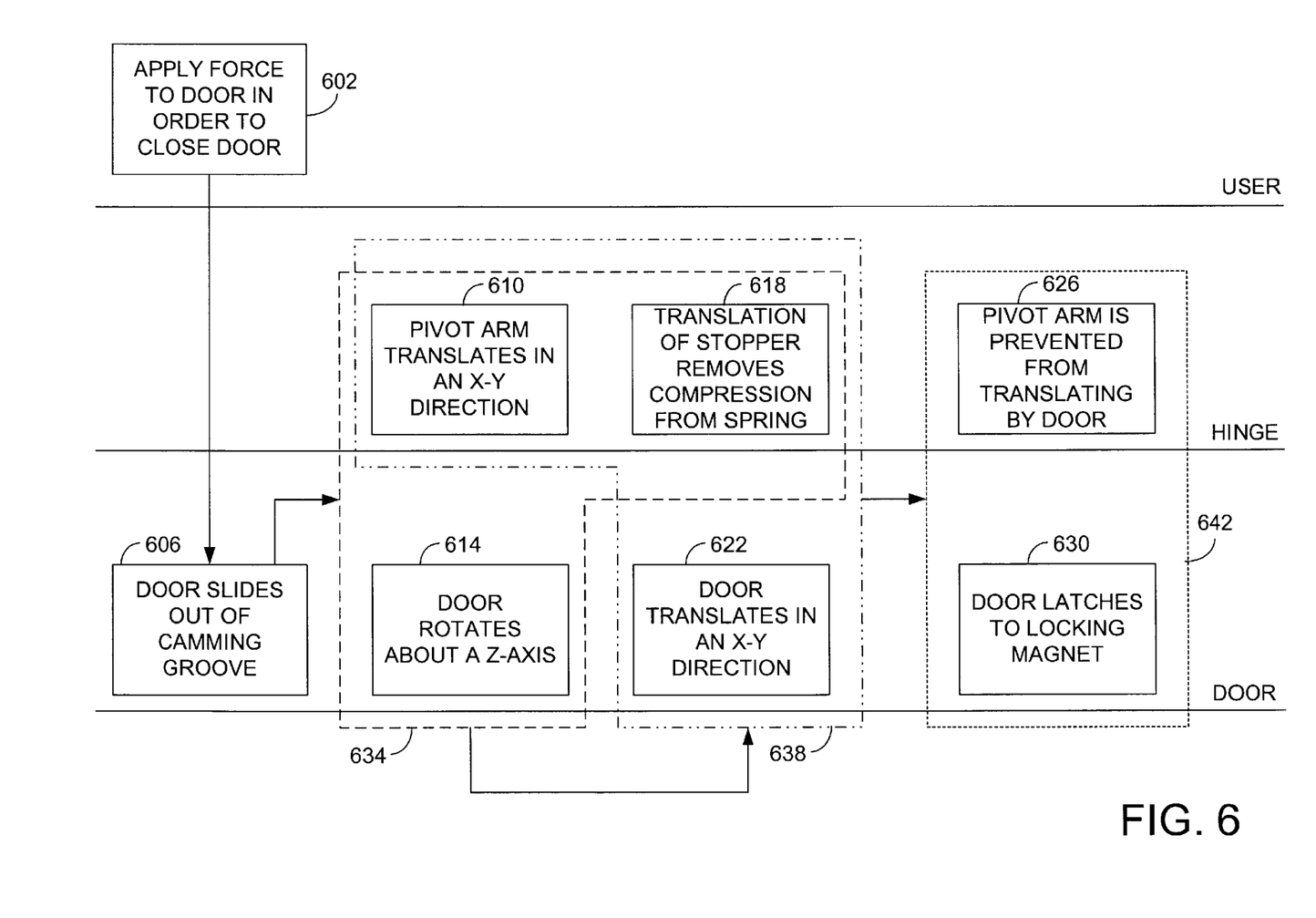
FIG. 6 is a block diagram representation of the actions associated with closing a door held by a translational hinge mechanism in accordance with an embodiment of the present invention.

A camming groove may hold a door in an open position until it is desired for the door to be closed with respect to a base section of a computing device. FIG. 6 is a block diagram representation of the actions which occur when a door that is coupled to a translational hinge mechanism is closed in accordance with an embodiment of the present invention. A first action or step 602 occurs when force or torque is applied to a door of a computing device, which is held in a camming groove, in order to close the door. Once the force is applied to the door, the next action 606 that occurs involves the door sliding out of the camming groove. As previously discussed, the camming groove or cam surface effectively holds the door in an open position with respect to the base section of a computing device. Hence, sliding the door out of the camming groove effectively enables the door to once again move with respect to the base section.

After the door slides out of the camming groove, an overall action 634 occurs in which the door rotates about a z-axis in an action 614, the pivot arm of the hinge mechanism translates in an x-y direction in an action 610, and the translation of the stopper coupled to the hinge mechanism removes compression from the spring of the hinge mechanism in an action 618. That is, the door begins to rotate while the pivot arm begins to translate. The translation of the pivot arm alters the compressive state of the spring and allows the spring to uncompress. The translation of the pivot arm generally moves the axis of rotation or the pivot point of the door closer to the outline of the base section.

After the door has rotated about the z-axis, as for example until a longitudinal axis of the door is substantially parallel to a longitudinal axis of the base section, the door then translates in an x-y direction in an action 622. The translation of the door generally occurs substantially simultaneously with actions 610 and 614 as a part of an overall action 638. In other words, while the door translates, the pivot arm and the stopper continue to translate. At some point after the door begins to translate or move linearly, the door will stop translating. The cessation of translation typically occurs when the door makes contact with the frame or chassis of the base section. Alternatively, in one embodiment, the door may cease to translate when the door is attracted by a latching magnet.

In an action 626, the pivot arm is prevented from translating by the door. That is, when the door is neither rotating nor translating, the pivot arm typically also ceases to translate. The cessation of the translation of the pivot arm may be a part of an overall action 642, and occur while the door latches to a locking magnet in an action 622. Once the door is latched to the locking magnet, the door is effectively closed.

Although only a few embodiments of the present invention have been described, it should be understood that the present invention may be embodied in many other specific forms without departing from the spirit or the scope of the present invention. By way of example, a translational internal hinge mechanism has been described as being suitable for use as a part of a portable computing device. It should be appreciated, however, that the use of a translational internal hinge mechanism is not limited to portable computing devices. For instance, a translational internal hinge mechanism may be implemented as a part of substantially any other suitable device, i.e., a device in which a piece is to be rotationally coupled to another piece. By way of example, the translational internal hinge may also be used in a desk top computing device.

While a camming groove or cam surface milled or otherwise formed on a frame is effective in maintaining a door in an open position by engaging the door and, hence, a portion of a hinge mechanism, a camming groove is only one example of a mechanism for essentially securing the door in an open position. In general, substantially any suitable mechanism may be used to hold the door in an open position. For example, a mechanical latch may be used to hold the door in an open position.

A door of a portable computing device has been described as being formed from a metallic material such as stainless steel. The use of stainless steel to form a door enables a door to be both relatively lightweight and relatively stiff. It should be appreciated, however, that the door of a portable computing device may be formed from a variety of different materials. Suitable materials include, but are not limited to, titanium, plastic, and composite materials.

As described above, a magnet may be used to facilitate a bond between a door and a frame of a base section when the door is closed with respect to the base section. In other words, a magnet may be used to keep the door shut tight against the frame, i.e., to effectively prevent the door from opening when the door is intended to be in a closed position. The magnet is arranged to attract a door which is formed from a metallic material such as stainless steel. When the door is formed from a material which a magnet either does not attract or does not attract strongly, then either a metallic surface may be added to the door to enable the magnet to attract the door, or a separate latching feature may be used to enable the door to latch against the frame.

A pivot arm has generally been described as being substantially "L-shaped." It should be appreciated, however, that the shape of pivot arm may vary widely. For instance, the pivot arm may include additional edges as necessary to accommodate the particular requirements of a portable computing device without departing from the spirit or the scope of the present invention.

Although an internal hinge mechanism has been described as including components such as a stop which is coupled to a pivot arm, as well as a spring, in one embodiment, a stop may be formed such that the stop is integral to the pivot arm. In other words, the stop and the pivot arm may be formed as one piece. The spring may also be removed from the hinge mechanism for an embodiment where at least a partial damping of the motion of a door is not desired. Alternatively, in some embodiments, the spring may be removed and replaced by an alternative damping mechanism.

Therefore, the present examples are to be considered as illustrative and not restrictive, and the invention is not to be limited to the details given herein, but may be modified within the scope of the appended claims.

What is claimed is:

1. A hinge mechanism for use with a door in a portable computing device, the hinge mechanism comprising:
   a spring coil, the spring coil having a compressive state;
   a stopper; and
   a pivot arm, the pivot art being coupled to the stopper, the pivot arm including a first section and a second section, the first section of the pivot arm being arranged to be positioned substantially within the spring coil, the second section of the pivot arm being arranged to be coupled to the door, wherein translational motion of the pivot arm causes the stopper to cause the compressive state of the spring coil to change.

2. A hinge mechanism according to claim 1 wherein the translational motion of the pivot arm causes the stopper to cause the spring coil to compress.

3. A hinge mechanism according to claim 1 wherein the translational motion of the pivot arm causes the stopper to cause the spring coil to decompress.

4. A hinge mechanism according to claim 2 wherein the portable computing device includes a frame, the frame being arranged to cooperate with the stopper to cause the spring coil to compress.

5. A computing device, the computing device comprising:
a base section including a frame, a door, and a hinge mechanism, the hinge mechanism being arranged to moveably couple the frame and the door, wherein the hinge mechanism is further arranged to translate when the door rotates with respect to an axis.

6. A computing device according to claim 5 wherein when the door is in a first position with respect to the frame, the axis passes through the base section, and when the door is in a second position with respect to the frame, the axis does not pass through the base section.

7. A computing device according to claim 5, wherein the hinge mechanism includes a pivot arm, a spring, and a plug, wherein the pivot arm is coupled to the door, and the plug cooperates with the pivot arm to position the spring between the plug and the frame.

8. A computing device according to claim 7 wherein the pivot arm includes a horizontal section and a vertical section, the horizontal section being substantially coincident with the axis, the vertical section being arranged to support the plug.

9. A computing device according to claim 8 wherein the base section has a footprint, and when the door is in a first position with respect to the frame, the horizontal section is within the footprint, and when the door is in a second position with respect to the frame, the horizontal section is substantially outside of the footprint.

10. A computing device according to claim 8 wherein when the door is in the second position, the door is arranged to rotate substantially about the axis.

11. A computing device according to claim 8 wherein the frame further includes a groove, the groove being arranged to engage the door to hold the horizontal section substantially outside of the footprint.

12. A computing device according to claim 9 wherein the door is arranged to cause the horizontal section to translate, the door further being arranged to cause the axis to translate.

13. A computing device according to claim 9 wherein the base section further includes a latching device, the latching device being arranged to hold the door substantially against the frame when the door is in the first position.

14. A computing device according to claim 12 wherein when the door rotates with respect to the axis, the door rotates with respect to the horizontal section substantially outside of the footprint.

15. A computing device according to claim 13 wherein the door is formed from a metallic material, and the latching device is a magnet that is arranged to attract the door.

16. A computing device according to claim 14 wherein the spring has a compressive state, and wherein when the door causes the horizontal section to translate, the plug and the frame cooperate to cause the compressive state of the spring to change.

17. A computing device according to claim 14 wherein the spring has a compressive state, and wherein when the door rotates with respect to the axis, the plug and the frame cooperate to cause the compressive state of the spring to change.

18. A hinge mechanism for coupling a first piece to a second piece, the hinge mechanism comprising:
a spring coil, the spring coil having a compressive state, the spring coil defining an opening therethrough;
a stopper; and
a pivot arm, the pivot art being coupled to the stopper, the pivot arm including a horizontal section and a vertical section, the vertical section being arranged at least partially within the opening defined through the spring coil, the stopper being arranged to cooperate with the first piece to substantially hold the vertical section at least partially within the opening defined through the spring coil, the horizontal section being arranged to be coupled to the second piece, wherein motion of the second piece causes the stopper to cause the compressive state of the spring coil to change.

19. A hinge mechanism according to claim 18 wherein the horizontal section defines an axis, the axis being an axis of rotation for the second piece.

20. A hinge mechanism according to claim 19 wherein the pivot arm is arranged to translate when the second piece rotates about the axis.

21. A hinge mechanism for use in a computing device, the hinge mechanism being configured to couple a door of the computing device to a housing of the computing device, the hinge mechanism enabling the door to move both translationally and rotationally relative to the housing.

22. The hinge mechanism as recited in claim 21 wherein the frame includes an opening, and wherein the door is configured to cover said opening.

23. A hinge mechanism as recited in claim 21 further configured to couple a trap door to the housing, the trap door being arranged to provide and prevent access to internal components housed within the housing, the hinge mechanism allowing the trap door to move between a closed position, where the trap door is seated within the footprint the housing, and an open position, where the trap door is positioned substantially outside of the footprint of the housing.

24. A hinge mechanism as recited in claim 21 comprising:
a translational component configured to allow the door to translate along a first axis;
a rotational component configured to allow the door to rotate about a second axis;
a biasing component configured to continuously bias the door in a predetermined direction along the first axis so as to help hold the door in an open or closed position.

25. A hinge mechanism as recited in claim 21 wherein the hinge mechanism allows the door to move between a closed position, placing the door in front of an opening of the housing so as to prevent access therethrough, and an open position, placing the door away from the opening of the housing so as to allow access therethrough.

26. The hinge mechanism as recited in claim 22 wherein the door translationally moves between a first position, placing the door adjacent the frame, and a second position, placing the door a predetermined distance away from the frame, and wherein the predetermined position enables the door to rotationally move between a third position, preventing access through the opening, and a fourth position, allowing access through the opening.

27. A hinge mechanism as recited in claim 25 wherein the hinge mechanism allows the door to be placed in the closed position without increasing the profile of the computing device or without requiring substantial gaps between the housing and the door.

28. The hinge mechanism as recited in claim 26 wherein the hinge mechanism includes a first member and a second member, the first member being slidably coupled to said frame, the door being rotatably coupled to said second member.

29. The hinge mechanism as recited in claim 28 further including a spring mechanism for biasing the door in the first position.

30. The hinge mechanism as recited in claim 29 further including a door securing system for securing the door in the first position.

31. The hinge mechanism as recited in claim 30 further including a camming mechanism for securing the door in the fourth position.

32. A computer, comprising:

an enclosure configured to house one or more electrical components, the enclosure having a passageway that provides access to the one or more electrical components;

a door configured to cover the passageway;

a hinge mechanism configured to rotationally and translationally couple the door to the enclosure so as to allow the door to close or open the passageway, the hinge mechanism allowing the door to close the passageway without increasing the profile of the enclosure or without requiring substantial gaps between the door and the enclosure.

33. A computer as recited in claim 32 wherein the electrical components correspond to connectors or ports.

34. A computer as recited in claim 32 wherein the enclosure includes a recessed portion, and wherein the door is positioned in the recessed portion when the door closes the passageway.

35. A computer as recited in claim 32 wherein the computer further includes a display section that pivots relative to the enclosure.

* * * * *